Figure 1:
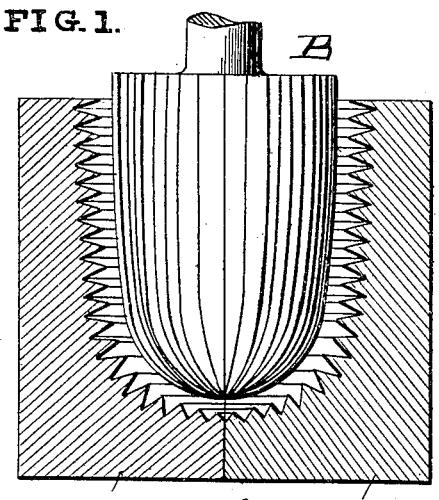

No. 792,606. PATENTED JUNE 20, 1905.
O. A. MYGATT.
PRESSED AND BLOWN RIBBED SHADE AND METHOD OF MAKING SAME.
APPLICATION FILED MAY 22, 1903.

WITNESSES:
Chas. K. Davies.
M. E. Brown.

INVENTOR
O. A. Mygatt
BY W. A. Bartlett
Attorney

No. 792,606.       Patented June 20, 1905.

UNITED STATES PATENT OFFICE.

OTIS A. MYGATT, OF NEW YORK, N. Y.

PRESSED AND BLOWN RIBBED SHADE AND METHOD OF MAKING SAME.

SPECIFICATION forming part of Letters Patent No. 792,606, dated June 20, 1905.

Application filed May 22, 1903. Serial No. 158,361.

*To all whom it may concern:*

Be it known that I, OTIS A. MYGATT, a citizen of the United States, residing at New York, in the county of New York and State of New York, have invented certain new and useful Improvements in Pressed and Blown Ribbed Shades and Methods of Making Same, of which the following is a specification.

This invention relates to a method of making ribbed globes or shades for artificial light from glass by a method of partly pressing and partly blowing.

The object of the invention is to produce ribbed glass shades or globes lighter and thinner than have been made in molds and having also the brilliance of fire-finish, such as has not heretofore been attained by molding.

Prisms have been pressed on molded or pressed glass articles, and to get a solid true prism it is necessary that the same be pressed or cut, as such cannot be blown, the tendency of blown glass being to preserve a substantially uniform thickness, so that a rib on the outer surface of a blown article generally causes a corresponding groove at the inner surface of the article. By my method I form inchoate globes or shades with prismatic ribs or grooves on both surfaces, and then by heating and blowing this inchoate article I expand the body and change the form of ribs to some extent and at the same time produce an unusually brilliant reflective surface on the article.

In the drawings I have indicated some of the mechanism employed in carrying out my process or method, and I also indicate some of the changes of form in the article.

Figure 2:
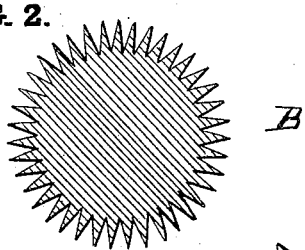
Figure 3:
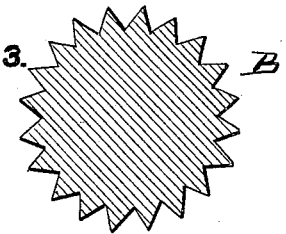
Figure 5:
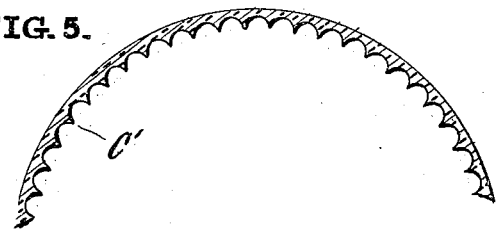
Figure 6:
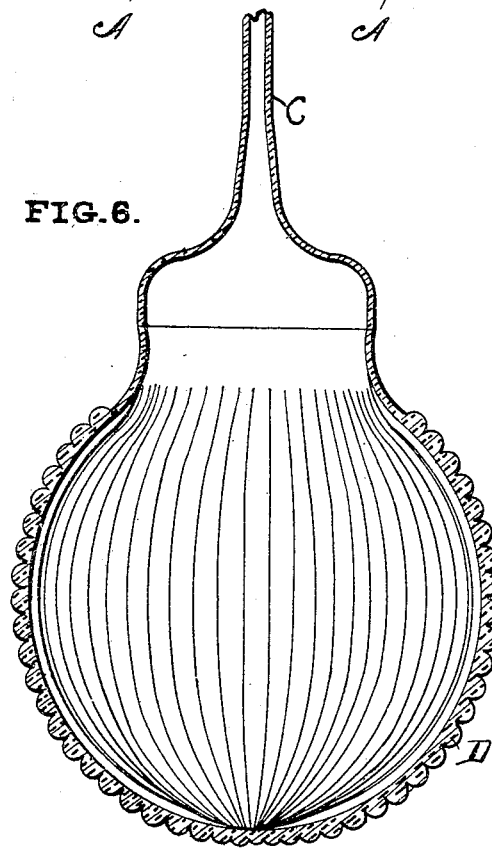
Figure 4:
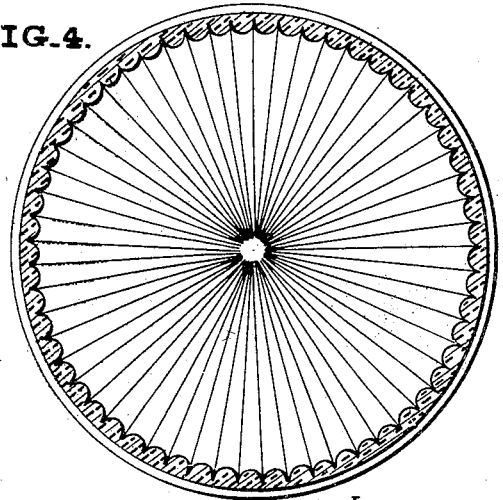

Figure 1 is a vertical section of a ribbed mold, showing plunger in elevation. Figs. 2 and 3 are cross-sections of plungers which may be used with said mold. Fig. 4 is a cross-section of a globe or shade after expansion by blowing, and Fig. 5 is a broken cross-section of a globe with inner ribs more attenuated. Fig. 6 is a vertical section of a globe or shade attached to the pontil or blowpipe.

Globes or shades having external and internal prismatic ribs are made by molding. In molding such globes a mold of the general character shown in the parts A A has been used and a plunger of the character indicated at B. In the present invention the ribs or flutings are made deeper or more pronounced than has heretofore been the practice.

In making prismatic globes the mold A A has been made of the outer diameter of the completed globe or shade. The plunger B was of the inner diameter. After withdrawal from the mold the open end of the globe was tooled down to a reduced diameter, and the tooling was apt to distort the prisms to some extent on that part of the globe so fashioned. In the present invention the mold A A and plunger B are of less diameter than the extreme diameter of the completed globe. A globe-blank is pressed in the mold in usual manner; but generally the grooves are deeper and the ribs are sharper than has heretofore been the custom. When the ribbed blank is withdrawn from the mold, it has external ribs which are horizontal or circumferential of the globe and internal ribs which are perpendicular and which form lunes. The globe-blank so formed is then attached to a pontil or blowpipe C and blown out to an increased diameter, as indicated in Fig. 6. The globe may be reheated in the glory-hole of a glass-furnace to insure its plasticity. The expansion of the globe by blowing, as well as the heat of the furnace, tends to round the sharp angles of the prisms, and the vertical and horizontal ribs instead of retaining their prismatic form become rounded, as shown in Figs. 4 and 6. If the prisms on the plunger B are made very sharp and the globe is blown out to a sufficient diameter, the internal ribs may be drawn out to present the appearance of mere flutings, as C', Fig. 5.

The interior of the globe may be heated by a jet of flame in manner well known in this art. This heating tends to round the ribs on the interior the same as external heating tends to round the exterior ribs D, and the heating of the ribbed blank gives to both surfaces the brilliant fire-finish of blown glass, which cannot usually be had on pressed-glass articles.

The ribbed surface of the globe produced by the process will not have true prisms thereon; but the prisms will be rounded. The article produced by the process will have at the points where the lines cross each other projections from both the outer and inner surfaces of the general body of the glass, such projections not being prisms, but having a bead-like appearance when seen through the glass from either face.

The great advantage of diminished weight as compared with pressed prismatic glass gives this blown shade an importance in this art which may not be readily comprehended.

Heretofore shades of blown glass blown in a mold have had external flutings or ribs; but in such case the shade had also internal flutings or ribs running in the same direction as the external ribs, and a convexity on the outer surface of the shade was sure to have a complementary concavity on the interior of the shade. No blown shades having ribs extending practically in transverse directions on opposite faces of the glass have been made prior to my invention.

What I claim is—

1. The method of producing ribbed globes of glass, which consists in pressing a blank of hot plastic glass in a mold, so as to produce projecting ribs on both surfaces and extending in transverse directions, then heating the blank and blowing it to increased diameter, whereby the ribs become rounded or less accentuated and the lines of crossing show projections from both faces.

2. A blown-glass globe having a fire-polish, said globe having projections opposite each other extending out from both faces of the general body of the glass.

3. A blown-glass globe having both external and internal ribs projecting from the faces of the glass, the lengthwise direction of the ribs being in generally transverse directions, and the projections at the points of crossing being in opposite directions.

4. A blown-glass globe having projections from its outer and from its inner surface opposite the same part of the body portion thereof, said projections being rounded and both surfaces of the globe having a fire-polish.

In testimony whereof I affix my signature in presence of two witnesses.

OTIS A. MYGATT.

Witnesses:
W. A. DOREY,
H. E. NASON.